United States Patent [19]

Peterson

[11] 4,371,880

[45] Feb. 1, 1983

[54] DISPOSABLE STYLUS AND RESERVOIR

[75] Inventor: Donald A. Peterson, Berwyn, Ill.

[73] Assignee: Stoelting Co., Chicago, Ill.

[21] Appl. No.: 293,490

[22] Filed: Aug. 17, 1981

[51] Int. Cl.³ .......................................... G01D 15/16
[52] U.S. Cl. ............................................... 346/140 R
[58] Field of Search ................................. 346/75, 140

[56] References Cited

U.S. PATENT DOCUMENTS 2,626,201  1/1953  Young et al. ...................... 346/140
2,973,237  2/1961  Whiteley ..................... 346/140 A X
4,307,410  12/1981  Hubbard ......................... 346/140 A

FOREIGN PATENT DOCUMENTS 745507  3/1944  Fed. Rep. of Germany ...... 346/140

Primary Examiner—Donald A. Griffin
Attorney, Agent, or Firm—William A. Snow

[57] ABSTRACT

A disposable stylus and housing for polygraph or other comparable instruments for recording responses from a subject on paper charts.

2 Claims, 7 Drawing Figures

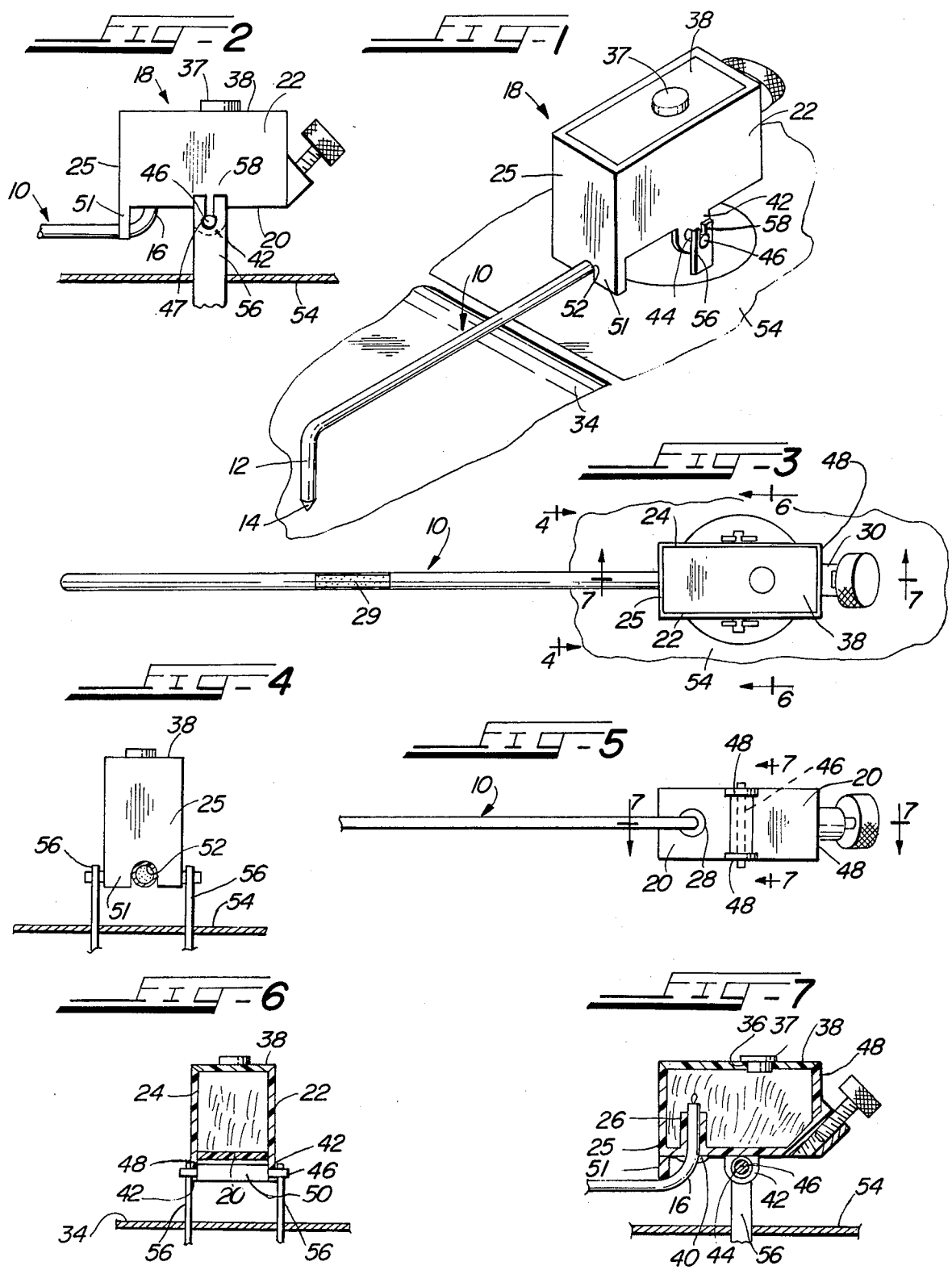

DISPOSABLE STYLUS AND RESERVOIR

BACKGROUND OF THE INVENTION

Heretofore, the stylus for recording responses from a subject used in connection with polygraphs and other comparable instruments were a permanent part of the equipment requiring the constant filling of a reservoir with a supply of ink and then, when the instrument was not in use, the ink in the reservoir and stylus had to be removed, requiring a thorough cleaning of the stylus and penpoint. It was to overcome this deficiency that the present invention was conceived.

SUMMARY OF THE INVENTION

This invention relates to disposable styli and reservoir used in polygraph instruments or comparable instruments for recording responses from a subject on chart paper, containing an ink reservoir filled with fibrous material for the stylus penpoint and an upwardly, angularly extending, adjustable counterbalance on the rear wall of the reservoir adjacent the lower end thereof and medially of the side walls, a horizontally-extending stylus containing a wick therein with the free end of the stylus tube terminating in a right angular bend and containing a penpoint, the housing containing downwardly-extending ears on each side wall offset medially thereof to support a pivot pin therebetween in perforations therein and which pin extends outwardly of the said ears.

BRIEF DESCRIPTION OF THE DRAWINGS

FIG. 1 is a side plan view of the present invention;
FIG. 2 is a top plan view of the device of FIG. 1;
FIG. 3 is a bottom plan view of the device of FIG. 1;
FIG. 4 is a cross-sectional view taken on the lines 4—4 of FIG. 3;
FIG. 5 is a cross-sectional view taken on the lines 5—5 of FIG. 3; and
FIG. 6 is a perspective view of the element for supporting the pivot pins.

DETAILED DESCRIPTION OF THE INVENTION

The stylus 10 is an elongated, hollow tube having one end bent downwardly at right angles as at 12 and containing a penpoint 14. The opposite end of the stylus is bent upwardly at right angles as at 16 and anchored interiorly of the housing 18, adjacent one end thereof, through the bottom wall 20 and medially of the side walls 22, 24, adjacent the front wall 25 and positioned in hollow, cylindrical, plastic tube 26, as clearly shown in FIG. 7. The cylindrical tube 26 integrally formed on the bottom wall 20 anchors the portion 16 of the stylus and an adhesive 28 is applied on the bottom therearound. The stylus is filled with a wick 29. The housing is completely constructed of a plastic and filled with a fibrous material.

The housing 18 is generally rectangular in shape having measurements of approximately 1 inch in length by 0.437 inches in width by 0.5625 inches in height.

A hollow, cylindrical portion 30 is molded into the rear wall and threaded interiorly. A large, headed machine screw 32 is disposed therein. The portion 30 extends at an angle of about 45° from the horizontal so that the stylus may be lifted upwardly, substantially vertically, when changing the chart paper 34. The screw is adjustable to act as a counterbalance for the stylus so that the pen tip 14 maintains good, light contact with the chart paper 34.

To fill the housing 18 with a supply of ink, an aperture 36 is provided in the top wall 38 and after filling, the aperture is plugged as at 37.

An integrally formed ear 42 depends from each side wall 22, 24 and each contains a medial perforation 44. A stationary pin pivot 46 extends through and outwardly of said perforations 44 and is anchored thereto by the ends of a tube 50 positioned against the inner walls of said ears 42 to retain the pivot pin 46 in the perforations. The tube diameter is only slightly greater than the pin 46. The perforations 44 of the ears 42 are positioned rearwardly of a vertical center line through the housing 18 and rearwardly toward the rear end wall 48 approximately 0.03 inches.

The front end wall 25 extends downwardly as at 51 below the bottom wall 20 and integral therewith. The bottom wall 20 is provided with an inverted, U-shaped opening 52 medially positioned between the side walls 22, 24 and in which part of the stylus seats to prevent the stylus from shifting laterally.

The carriage or cradle for supporting the device is standard and consists of a base 54 anchored on the galvanometer pen motor of the instrument having a pair of upwardly-extending arms 56 and each containing a slot 58 terminating in an arcuate seat to support the ends of the pivot pin 46. Aperture 47 is also provided in the slots 58 of the pen cradle to hold the pen captive while the instrument is in transit. The styli are usually five and five and one-half inches measured horizontally in length from the pivot pin to the center of the penpoint.

Because the device is manufactured inexpensively, it may be removed from its carriage and thrown away when the supply of ink in the reservoir is exhausted thus eliminating cleaning and refilling, or the plug 36 may be removed and the housing refilled with a supply of ink.

Although but one specific embodiment of this invention is herein shown and described, it will be understood that details of the construction shown may be altered or omitted without departing from the spirit of the invention as defined by the following claims.

I claim:

1. A disposable stylus and housing therefor comprising a hollow housing having top, bottom, front and rear end walls, an interiorly threaded hollow portion on said rear wall medially of said side walls and extending angularly upwardly from said bottom wall, a headed screw disposed therein, a cylindrical tube extending upwardly in said housing and integrally formed on said bottom wall adjacent said front end wall, said tube communicating with the interior of said housing and outside of said bottom wall, a horizontally-extending stylus, one end of said stylus bent at right angles upwardly and rigidly seated in said tube, the opposite end of said stylus bent downwardly, a penpoint in said latter end, a wick in said stylus, fibrous material packed in said housing, filling means whereby to supply ink interiorly of said housing and said filling means then being plugged, a pair of ears each extending downwardly from the lower ends of said side walls and containing a perforation in each ear and a pivot pin extending between and through said perforations.

2. The device according to claim 1 wherein a tube is anchored between the ears and to the pivot pin to retain it in position.

* * * * *